(12) United States Patent
Kim et al.

(10) Patent No.: US 6,770,717 B2
(45) Date of Patent: Aug. 3, 2004

(54) SEQUENTIALLY ORDERED BIODEGRADABLE LACTIDE (GLYCOLIDE OR LACTIDE/GLYCOLIDE)ϵ-CAPROLACTONE MULTI-BLOCK COPOLYMER AND PROCESS FOR THE PREPARATION THEREOF

(75) Inventors: Young Ha Kim, Seoul (KR); Soo Hyun Kim, Seoul (KR); Soo-Hong Lee, Seoul (KR); Oju Jeon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 62 days.

(21) Appl. No.: 10/298,111

(22) Filed: Nov. 14, 2002

(65) Prior Publication Data

US 2003/0139567 A1 Jul. 24, 2003

(30) Foreign Application Priority Data

Nov. 21, 2001 (KR) .......................................... 2001-72538

(51) Int. Cl.$^7$ .......................... C08G 63/08; C08G 65/08
(52) U.S. Cl. ........................ 525/403; 525/408; 525/411; 525/413; 528/301; 528/354
(58) Field of Search .................................. 525/403, 408, 525/411, 413; 528/301, 354

(56) References Cited

U.S. PATENT DOCUMENTS 4,057,537 A * 11/1977 Sinclair ....................... 528/354
6,476,156 B1 * 11/2002 Kim et al. .................. 525/403

* cited by examiner

*Primary Examiner*—Duc Truong
(74) *Attorney, Agent, or Firm*—Jones Day

(57) ABSTRACT

Disclosed is a sequentially ordered biodegradable lactide (or glycolide or lactide/glycolide)/ϵ-caprolactone multi-block copolymers having proper degradation properties and enhanced mechanical properties such as flexibility and elasticity and a process for the preparation thereof.

10 Claims, 1 Drawing Sheet

SEQUENTIALLY ORDERED BIODEGRADABLE LACTIDE (GLYCOLIDE OR LACTIDE/GLYCOLIDE)ε-CAPROLACTONE MULTI-BLOCK COPOLYMER AND PROCESS FOR THE PREPARATION THEREOF

FIELD OF THE INVENTION

The present invention relates to sequentially ordered biodegradable lactide (or glycolide or lactide/glycolide)/ε-caprolactone multi-block copolymers having proper degradation properties and enhanced mechanical properties such as flexibility and elasticity and a process for the preparation thereof. The present invention further relates to biodegradable materials comprising the multi-block copolymers having proper hydrolytic properties and enhanced mechanical properties.

BACKGROUND OF THE INVENTION

With heightened interest in biodegradable polymer materials for medical application, research thereto is hurriedly under way. These materials include natural biodegradable polymers and synthetic biodegradable polymers. Natural biodegradable polymers include polypeptides such as collagen and gelatin; polyamino acids such as poly-L-glutamic acid and poly-L-lysine; and polysaccharides such as alginic acid and chitin. Natural biodegradable polymers have poor resulting mechanical properties and are difficult to process and mass-produce.

Accordingly, there is a need for research on synthetic polymers. Among key materials in this research are aliphatic polyesters that have both excellent physical properties and excellent hydrolytic properties. However, these synthetic polymers must satisfy requirements including biostability, biocompatibility, low toxicity, and low immunogenicity as they are to be used in the human body. Therefore, research is restricted to materials that are either approved by authorities such as the FDA or known to be biologically compatible. Biodegradable synthetic polymers commonly and currently used include polycaprolactone (PCL), polyglycolide (PG), polylactide (PL) and their derivatives such as lactide/glycolide copolymer and lactide/ε-caprolactone copolymer.

Further, the need for more flexible and more elastic biodegradable materials has increased since biodegradable polymers such as polyglycolide, polylactide, and lactide/glycolide copolymer, actively researched at present, are hard materials. Attempts at making softer and more elastic copolymers by copolymerizing lactide and glycolide with soft ε-caprolactone are still deficient. This copolymer exists in the form of either random or block copolymer (U.S. Pat. No. 4,057,537). The limited physical properties of the copolymer restrict its usefulness as a biodegradable material, especially as a regeneration material of human tissues or organs because such material requires various physical properties.

The sequentially ordered biodegradable multi-block copolymer shows a variety of new physical properties that conventional materials do not have. Further, ε-caprolactone block in such copolymer provides elasticity to the material as a soft segment beyond the softening effect on the hard polylactide. This elastic material is will be very effective in assisting regeneration of elastic tissues such as tissues of skeletal muscle, smooth muscle and cardiac muscle, because these tissues need very strong elasticity.

SUMMARY OF THE INVENTION

According to the present invention, there is provided a biodegradable lactide (or glycolide or lactide/glycolide)/ε-caprolactone multi-block copolymer with proper biodegradability and enhanced mechanical properties such as flexibility and elasticity, and a method for preparing the same.

The biodegradable multi-block copolymer is of Formula 1, which is as follows.

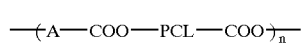

[Formula 1]

wherein,
A is polylactide (PL), polyglycolide (PG), or polylactide/polyglycolide (PL/PG), PCL is poly ε-caprolactone, and
n is an integer from 2 to 2,000.

The present method for preparing the biodegradable multi-block copolymer of Formula 1, comprises the steps of:

providing a polylactide (or polyglycolide or polylactide/polyglycolide) and poly ε-caprolactone; introducing acylhalide functional groups to both terminals of said polylactide (or polyglycolide or polylactide/polyglycolide); and coupling the acylhalide functional groups located at the terminals of the polylactide (or polyglycolide or polylactide/polyglycolide) with the corresponding hydroxyl functional groups located at the terminals of the poly ε-caprolactone.

The molecular weight of the multi-block copolymer may be from about 2,000 to 500,000 daltons. The molecular weight of the polylactide, polyglycolide or poly ε-caprolactone may be about 500 to 30,000 daltons. The composition molar ratio of lactide, glycolide or lactide/glycolide to ε-caprolactone is about 1/9 to 9/1, and preferably, the composition molar ratio of lactide to ε-caprolactone is 1/9 to 9/1.

The present invention provides medical materials such as matrix for medical use and wound covering made from these lactide (or glycolide or lactide/glycolide)/ε-caprolactone copolymers.

The above and other objects and features of the present invention will become apparent from the following description of the preferred embodiments given in conjunction with the accompanying drawing.

DETAILED DESCRIPTION OF THE PRESENT INVENTION

Figure 1:
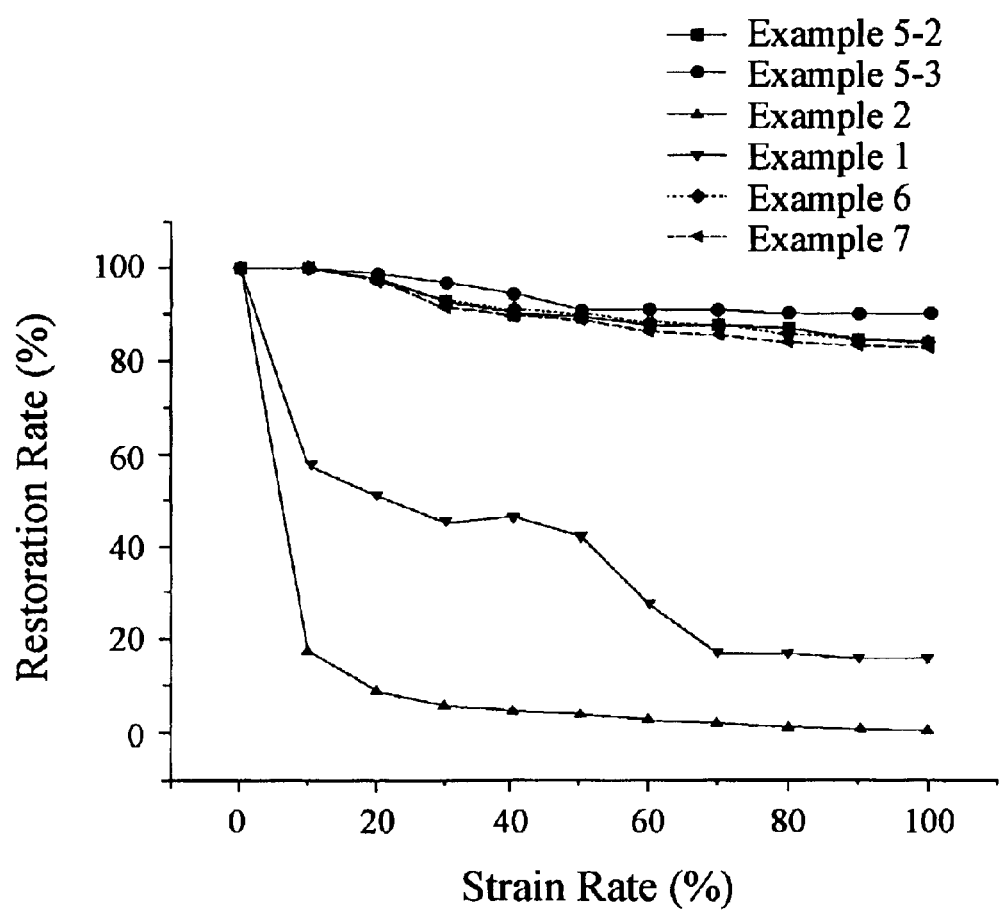
FIG. 1 is a graph showing the restoration percentage with respect to certain deformation percentage.

It has been discovered that sequentially ordered and equally spaced biodegradable lactide (or glycolide or lactide/glycolide)/ε-caprolactone multi-block copolymer has proper biodegradability and enhanced mechanical properties including flexibility and elasticity. Accordingly, the present invention provides a sequentially ordered biodegradable lactide (or glycolide or lactide/glycolide)/ε-caprolactone multi-block copolymer with proper biodegradability and enhanced mechanical properties, and a method for preparing the same.

The biodegradable lactide (or glycolide or lactide/glycolide)/ε-caprolactone multi-block copolymer of the present invention is prepared by a method which comprises the steps of preparing a polylactide (or glycolide or lactide/glycolide), introducing a functional group of relatively high reactivity present at the terminal of said polymer and preparing multi-block copolymer by coupling the functional group at the terminal of the polylactide (or glycolide or lactide/glycolide) with the corresponding hydroxy functional group located at the terminal of the poly ε-caprolactone.

Specifically, the lactide (or glycolide or lactide/glycolide)/ε-caprolactone multi-block copolymer of the present invention has the structure of Formula 1 as follows, which can be used as materials for tissue engineering or medical materials.

[Formula 1]

in which A is polylactide (PL), or polyglycolide (PG), or polylactide/polyglycolide (PL/PG), PCL is poly ε-caprolactone, and n is an integer between 2 to 2,000.

The present invention will now be described using the following examples particularly for polylactide. This should not be construed as a limitation to the present invention as it is only exemplary thereto.

One way of making the multi-block copolymer of the present invention begins with preparing polylactide by ring-opening polymerization of lactide, then purifying the polylactide for removing unreacted monomer and initiator therefrom by dissolving the polylactide in chloroform or methylene chloride, and then precipitating it in methanol, introducing highly reactive acylhalide functional group at the terminal of the purified polylactide, and coupling it with polycaprolactone.

The first step in preparing the copolymer is the synthesis of polylactide. L-lactide and 1,6-hexanediol are put in a glass ampule with a catalyst, for example, stannous octoate. The ampule is sealed in a high vacuum state and the sealed ampule is put in an oil bath to carry out polymerization. After completing the reaction, the ampule is destroyed to collect the polymer and the collected sample is dissolved in a solvent, for example, chloroform. Thereafter, it is extracted in methanol to produce polylactide with hydroxy groups attached at both terminals (OH-PL-OH) (See scheme 1).

[Scheme 1]

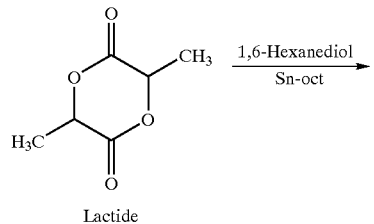

Lactide

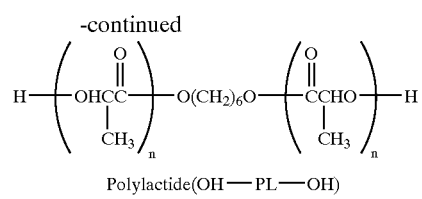

Polylactide(OH—PL—OH)

Lactide comprises L-lactide, D-lactide and isomers of D,L-lactide. In ring-opening polymerization of these lactides, catalysts such as stannous chloride, stannous octoate, stannous oxide, zinc chloride and zinc oxide can be used. Among these catalysts and lactides, biologically compatible L-lactide and FDA-approved stannous octoate are most widely used in synthesizing biodegradable polymer materials.

In the present invention, the biologically compatible L-lactide and stannous octoate can be used as a lactide and a catalyst, respectively and 1,6-hexanediol can be used as an initiator to produce polylactide, the number average molecular weight of which is about 6,000. The molecular weight of polylactide can be controlled by changing the ratio of the monomer L-lactide to the initiator 1,6-hexanediol. High molecular weight polylactide is also obtainable through this process.

Ring-opening polymerization reaction of lactide is more advantageous than condensation polymerization of lactic acid as the molecular weight of the resulting polylactide can be controlled and the polylactide having high molecular weight can be prepared. Further, the resulting polylactide shows more uniform distribution in molecular weight.

While ring-opening polymerization reaction of lactide can be carried out by bulk polymerization, solution polymerization, suspension polymerization, etc., bulk polymerization is preferred because it prevents impurities such as organic solvent and suspension stabilizer from being blended therein. The appropriate reaction temperature of aliphatic polyester such as lactide and glycolide is between about 130 and 180° C. If the reaction temperature goes over 200° C., transesterification occurs, which prohibits the formation of the polymer of desired structure.

The polylactide is very easily dissolved in solvents such as chloroform and methylene chloride and the solution is extracted in methanol to effectively remove the unreacted monomer and initiator. The resulting polylactide (OH-PL-OH) has the hydroxy group(s) in the terminal(s). Depending on the kind of initiator used in the synthesis, the number of the hydroxy group can be controlled. 1,6-hexanediol used in the present invention is a secondary alcohol with two hydroxy groups, which may make the hydroxy group present in both terminals of polylactide.

The second step following the synthesis of the polylactide is related to the process of substituting both the terminals of the polylactide with highly reactive functional groups. First, carboxyl acid is introduced to both terminals of polylactide. Thereafter, the carboxyl acids at the terminals of polylactide are replaced with acylhalide functional group, respectively. (See scheme 2)

[Scheme 2]

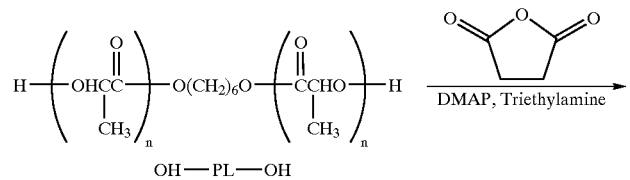

OH—PL—OH

-continued $$HOCH_2CH_2\overset{O}{\underset{\|}{C}}\overset{O}{\underset{\|}{C}}-\left(-OH\overset{O}{\underset{\|}{C}}\overset{}{\underset{CH_3}{C}}-\right)_n-O(CH_2)_6O-\left(-\overset{O}{\underset{\|}{C}}\overset{}{\underset{CH_3}{C}}HO-\right)_n-\overset{O}{\underset{\|}{C}}CH_2CH_2\overset{O}{\underset{\|}{C}}OH \xrightarrow[DMF]{SOCl_2}$$

HOOC—PL—COOH $$ClC\overset{O}{\underset{\|}{C}}CH_2CH_2\overset{O}{\underset{\|}{C}}-\left(-OH\overset{O}{\underset{\|}{C}}\overset{}{\underset{CH_3}{C}}-\right)_n-O(CH_2)_6O-\left(-\overset{O}{\underset{\|}{C}}\overset{}{\underset{CH_3}{C}}HO-\right)_n-\overset{O}{\underset{\|}{C}}CH_2CH_2\overset{O}{\underset{\|}{C}}Cl$$

ClCO—PL—COCl

At both terminals of the polylactide synthesized in the first step are hydroxy group. The hydroxy groups open the succinic anhydride ring to introduce carboxyl acids. Although basic pyridine, triethylamine, etc., can be used in the reaction as a catalyst, the highest reaction rate was achieved when triethylamine (TEA) and dimethylaminopyridine (DMAP) were used simultaneously. Higher reaction rate was achieved when 1,4-dioxane was used as a reaction solvent than when chloroform was used.

Polylactide (HOOC-PL-COOH) having carboxyl acid in both terminals reacts with thionyl chloride (SOCl$_2$) to substitute carboxyl acids with more highly reactive acylhalide groups. At this stage, anhydrous methylene chloride is used as a reaction solvent and dimethyl formamide (DMF) is used as a catalyst. The reactions are maintained at 60° C. for 3–4 hours. The acylhalide functional groups at both terminals of polylactide are very unstable due to the high reactivity and react with moisture in the air to return to carboxyl acid if the synthesized polylactide is stored for a prolonged time. Therefore, the polylactide having acylhalide functional group at both terminals must be used in coupling reaction immediately after its formation.

The last step is a coupling reaction between polylactide (ClCO-PL-COCl) having acylhalide functional groups at both terminals that is synthesized in the second step and poly ε-caprolactone (HO-PCL-OH) having hydroxy groups at both terminals. Lactide/ε-caprolactone multi-block copolymer can be prepared through the reaction. Basic pyridine is used as a solvent or a catalyst during reaction and it functions to induce forward reaction by removing hydrogen chloride gas generated during reaction. Because heat is generated by its addition, pyridine is added slowly at 0° C.

Yield of the lactide/ε-caprolactone multi-block copolymer prepared by the process exceeded 90% quantitatively. The coupling reaction between the terminal functional groups could be confirmed by determining the increase in molecular weight and the reaction of each functional group via Gel Permeation Chromatography (GPC) and $^1$H-NMR.

As a comparative example, a lactide/ε-caprolactone random copolymer and a lactide/ε-caprolactone/lactide tri-block copolymer were prepared and compared.

As a result of thermal analysis by Differential Scanning Calorimetry (DSC), the random copolymer showed lower glass transition temperature (Tg) than others and did not have a melting point (Tm) due to its amorphous property. However, each tri-block copolymer was shown to have its respective unique melting point. Multi-block copolymer, on the other hand, had single melting point, which is about 15° C. lower than the melting point of the tri-block copolymer.

As a result of the analysis by Instron, which measures mechanical properties of the material, all of the copolymers were shown to have elongation of more than 450%. Tensile strength of tri-block copolymer was shown to be 20 Mpa, that of multi-block copolymer was 11–17 Mpa, and that of random copolymer was 0.001 Mpa.

Upon elasticity test, tri-block copolymer and random copolymer showed a low restoration rate of 57% and 17%, respectively for a 10% strain rate, while lactide/ε-caprolactone multi-block copolymer showed as high as at least 90% restoration rate even when strain rate was 50% (See FIG. 1).

COMPARATIVE EXAMPLE 1

L-lactide 14.4 g (0.1 mol) and ε-caprolactone 11.4 g (0.1 mol) were put in a 100 ml dried glass ampule, and stannous octoate 0.406 g (0.001 mol) as a catalyst and 1,6-hexanediol

[Scheme 3]

$$ClCCH_2CH_2\overset{O}{\underset{\|}{C}}-\left(-OH\overset{O}{\underset{\|}{C}}\overset{}{\underset{CH_3}{C}}-\right)_n-O(CH_2)_6O-\left(-\overset{O}{\underset{\|}{C}}\overset{}{\underset{CH_3}{C}}HO-\right)_n-CCH_2CH_2CCl \;+\;$$

ClCO—PL—COCl $$H-\left(OCH_2CH_2CH_2CH_2CH_2\overset{O}{\underset{\|}{C}}\right)_m-OCH_2CH_2-\left(\overset{O}{\underset{\|}{O C}}CH_2CH_2CH_2CH_2CH_2\right)_m-OH \xrightarrow{Pyridine}$$

HO—PCL—OH $$\left[\left(-O\overset{O}{\underset{\|}{C}}HC\overset{}{\underset{CH_3}{}}-\right)_a\left(-OCH_2CH_2CH_2CH_2CH_2\overset{O}{\underset{\|}{C}}\right)_b\right]_c$$

Lactide/ε-Coprolactone Multi-Block Copolymer 0.059 g (0.0005 mol) as an initiator were added. A teflon-coated magnetic bar was introduced in the ampule. The ampule was maintained in a vacuum state at 0.01 mmHg for about 2 hours to remove water, and the ampule was heat sealed. The sealed ampule was put in an oil bath of 150° C. and polymerization was carried out by stirring for 24 hours. As the polymerization proceeded, the viscosity of the polymerization system increased until stirring was no longer possible. After completing the reaction, the ampule was fully cooled by liquid nitrogen and then destroyed to collect the polymer. The collected sample was dissolved in chloroform and then precipitated in methanol to remove the catalyst, unreacted monomer and low molecular weight polymer. The obtained sample was dried under vacuum at ambient temperature for at least 24 hours.

Analysis by Gel Permeation Chromatography (GPC) using chloroform as a mobile phase solvent at a flow rate of 1 ml/min, revealed the average molecular weight and molecular weight distribution of the polymer were shown to be 46,000 and 1.70, respectively. Analysis by Differential Scanning Calorimetry (DSC) showed the glass transition temperature to be 8.36° C.

COMPARATIVE EXAMPLE 2

$\epsilon$-caprolactone 11.4 g (0.1 mol), stannous octoate 0.203 g (0.0005 mol) as a catalyst and 1,6-hexanediol 0.059 g (0.0005 mol) as an initiator were added to a 100 ml dried three neck flask. A stirrer was installed in the flask containing the reactants and the flask was maintained in a vacuum state at 0.01 mmHg for about 2 hours to remove water, and dry nitrogen was continuously introduced.

The flask was put in an oil bath of 110° C. and polymerization was carried out by stirring for 40 hours. As the polymerization proceeded, the viscosity of the polymerization system increased. L-lactide 14.4 g (0.1 mol) and stannous octoate 0.203 g (0.0005 mol) were additionally added in the flask and then the flask was put in an oil bath of 120° C. and polymerization was carried out by stirring for 150 hours. As the polymerization proceeded, the viscosity of the polymerization system increased and stirring of the reactions could no longer be made. After completing the reaction, the ampule was fully cooled by liquid nitrogen and then destroyed to collect the polymer. The collected sample was dissolved in chloroform and then precipitated in methanol to remove the catalyst, unreacted monomers and a low molecular weight of polymer. The obtained sample was dried under vacuum at ambient temperature for at least 24 hours.

The resulting polymer was white in color and the yield was at least 95%. From $^1$H-NMR, it was identified that the rings of $\epsilon$-caprolactone and lactide were opened by the initiator and that tri-block was formed. Glass transition temperature and melting point of the polymer determined by DSC were 54.00° C. and 165.31° C., respectively.

EXAMPLE 1

L-lactide 200 g (1.3889 mol) was put in a 500 ml dried glass ampule, and stannous octoate 2.8007 g (0.0069 mol) as a catalyst and 1,6-hexanediol 12.5434 g (0.1063 mol) as an initiator were added therein. A teflon-coated magnetic bar was introduced in the ampule. The ampule was maintained in a vacuum state at 0.01 mmHg for about 2 hours to remove water, and then dry nitrogen was introduced. This procedure was repeated five times and the ampule was heat sealed under vacuum with a torch lamp.

The sealed ampule was put in an oil bath of 130° C. and polymerization was carried out by stirring for 5 hours. As the polymerization proceeded, the viscosity of the polymerization system increased and stirring of the reactions could no longer be made. After completing the reaction, the ampule was fully cooled by liquid nitrogen and then destroyed to collect the polymer. The collected sample was dissolved in chloroform. Thereafter, it was precipitated in methanol to remove the catalyst, unreacted monomers and a low molecular weight polymer and dried under vacuum at ambient temperature for at least 24 hours.

The resulting polymer was white in color and the yield exceeded 95% quantitatively. From $^1$H-NMR, it was identified that the ring of the lactide was opened by the initiator and that the hydroxy groups were introduced at both terminals. From the integral ratio of terminal groups and the monomer, the molecular weight of the polymer was identified to be about 2,800. By DSC, the glass transition temperature and melting point of the polymer were 47.85° C. and 144.53° C., respectively.

By controlling the molar ratio of the initiator 1,6-hexanediol and the monomer lactide, polylactides having 1,000 to 10,000 of a molecular weight were prepared.

EXAMPLE 2

The polymer 10.00 g (0.0036 mol) prepared in Example 1 and succinic anhydride 0.9023 g (0.0090 mol) were put in a 500 ml flask, and dimethyleneaminopyridine (DMAP) 0.9319 g (0.0076 mole) and triethylamine 0.7961 g (0.0076 mol) were added as catalysts. 1,4-dioxane (200 ml) was added as a solvent and reacted for 24 hours at ambient temperature. Thereafter, the reactions were precipitated in methanol to remove the unreacted succinic anhydride and the catalysts and dried under vacuum at ambient temperature for at least 24 hours. From $^1$H-NMR, it was identified that the ring of succinic anhydride was opened by the hydroxyl groups and the carboxyl groups were introduced at the terminals.

Using polylactides having a molecular weight of 1,000 to 10,000 that were prepared in Example 1, the product, HOOC-PL-COOH, was synthesized and purified in the same manner as described above.

EXAMPLE 3

HOOC-PL-COOH 5.00 g (0.0017 mol), synthesized in Example 2, was put in 250 ml flask and completely dissolved in 125 ml of a purified methylene chloride. Thionyl chloride 0.8086 g (0.0068 mol) and two to three drops of dimethylformamide as a catalyst were added to the solution. The reaction was carried out at 60° C. for about 3 hours, and the reaction solution was then distilled under vacuum to remove the solvent and unreacted thionyl chloride. From $^1$H-NMR, it was identified that the acylhalide groups were introduced at the terminals. The identified sample was immediately used in a coupling reaction without purification step.

Using polylactides having molecular weight 1,000 to 10,000 (HOOC-PL-COOH) that were synthesized in Example 2, the product, ClOC-PL-COCl, was synthesized in the same manner as described above.

EXAMPLE 4

Each of Polycaprolactonediol 10.00 g (0.0080 mol) having molecular weights of 530, 1,250, 2,000 and 3,000, respectively, which were synthesized by Polysciences, Inc., (USA), was dissolved in chloroform and then precipitated in ethylether for purification. These samples were dried under vacuum at ambient temperature for at least 24 hours.

EXAMPLE 5

Polylactide 5.00 g (0.0017 mol) of molecular weight 3,000 synthesized in Example 3, and polycaprolactonediol 2.125 g (0.0017 mol) of molecular weight 1,250, which as synthesized in Example 4, were put in 250 ml flask and the flask was placed completely under nitrogen atmosphere. The reactions were completely dissolved in 75 ml of a purified methylene chloride. Thereafter, 1 ml purified pyridine was added slowly to the solution after maintaining the flask in an ice bath at 0° C. After the addition of pyridine, the reaction was allowed for 24 hours at ambient temperature. Thereafter, the reaction solution was precipitated in methanol to yield polymer, which was dried under vacuum at ambient temperature for at least 24 hours. From $^1$H-NMR after the reaction, it was identified that the hydroxy groups and acylhalide groups were coupled quantitatively. Furthermore, through GPC analysis, the prepared multi-block copolymer had a larger molecular weight than each polycaprolactone and polylactide and showed unimodal molecular weight distribution, from which it was identified that the multi-block copolymer of the complete structure was obtained.

Also, by using polylactide (ClOC-PL-COCl) and polycaprolactonediol of various molecular weight obtained in Examples 3 and 4, respectively, each product was synthesized and purified in the same manner as described above. The formation of the multi-block was then identified through the same analysis.

EXAMPLE 6

Multi-block copolymer of polyglycolide and polycaprolactone was prepared by the same method as described in Example 5 except that polyglycolide 1.7 g (0.0017 mol) having the molecular weight of 1,000 was used as a starting material.

EXAMPLE 7

Multi-block copolymer of polylactide/polyglycolide and polycaprolactone was prepared by the same method as described in Example 5 except that polylactide/polyglycolide copolymer 5 g (0.0017 mol) having a molecular weight of 3,000 was used as a starting material.

TABLE 1

Characteristics according to kinds of copolymers and variation in composition ratio thereof

| Examples | Composition Molar Ratio[a] | Tg (° C.) | Tm (° C.) | Weight Average MW | Distribution of MW | Elongation Ratio (%) | Tensile strength (MPa) | Modulus (MPa) |
|---|---|---|---|---|---|---|---|---|
| Comp. Exam. 1 | [CL]/[LA] 4.99/5.01 | −8.47 | — | 46000 | 1.7 | 468 | 0.001 | 0.6 |
| Comp. Exam. 2 | [CL]/[LA] 0.58/0.42 | — | 54, 165.31 | 82000 | 1.67 | 654 | 20.02 | 220 |
| Exam. 5 | [CL]/[LA] 0.09/0.91 | 43.9 | 154.1 | 36000 | 2.2 | — | — | — |
| 2 | [CL]/[LA] 0.22/0.78 | 23.7 | 150.1 | 98000 | 2.37 | 618 | 10.83 | 39.3 |
| 3 | [CL]/[LA] 0.27/0.73 | 24.2 | 150.4 | 43000 | 1.3 | 738 | 16.48 | 21.4 |
| Exam. 6 | [CL]/[GL] 0.56/0.44 | 21.3 | 156.7 | 54000 | 2.1 | 673 | 8.69 | 17.8 |
| Exam. 7 | [CL]/[GL]/[LA] 0.40/0.42/0.18 | 28.4 | — | 48000 | 1.9 | 752 | 7.12 | 15.9 |

[a]Molar ratio measured by $^1$H-NMR method
LA: lactide, GL: glycolide, CL: caprolactone

EXAMPLE 8

By using a hot press, each of 5 g of ε-caprolactone/L-lactide multi-block copolymer, ε-caprolactone/glycolide multi-block copolymer and ε-caprolactone/(lactide/glycolide) multi-block copolymer prepared in Examples 5, 6 and 7, respectively, was processed into film of sheet form with the thickness of 1 mm. After cutting the films into pieces (10 mm×70 mm), the mechanical properties and elasticity were measured using an Instron (Model 5567, Canton, Mass., USA). Table 1, above, tabulates the measured data.

As shown in Table 1, the multi-block copolymers of the present invention are characterized in having one melting point. This is distinguished from conventional random copolymer of Comparative Example 1, which does not have melting point. This is also distinguished from conventional tri-block copolymer of Comparative Example 2, which has two melting points. The multi-block copolymers of the present invention have appropriate tensile strength and modulus so that it is easy to process the copolymers, and their elongation ratios are higher than conventional copolymers.

TABLE 2

Restoration rate according to kind of copolymer and applied change of strain rate

| Strain rate (%) | | 10 | 20 | 30 | 40 | 50 | 60 | 70 | 80 | 90 | 100 |
|---|---|---|---|---|---|---|---|---|---|---|---|
| Comp. Exam. 1 | | 57.6 | 51.0 | 45.1 | 46.5 | 42.1 | 27.3 | 16.9 | 16.9 | 15.9 | 15.9 |
| Comp. Exam. 2 | | 17.6 | 8.8 | 5.5 | 4.6 | 4.0 | 2.4 | 1.9 | 1.0 | 0.8 | 0.2 |
| Exam. 5 | 1 | 0 | — | — | — | — | — | — | — | — | — |
|  | 2 | 100 | 97.6 | 92.8 | 90.3 | 89.5 | 87.6 | 87.6 | 87.3 | 84.9 | 84.0 |
|  | 3 | 100 | 98.9 | 96.9 | 94.5 | 90.8 | 90.9 | 90.9 | 90.2 | 90.2 | 90.2 |
| Exam. 6 | | 100 | 97.3 | 92.6 | 91.0 | 90.2 | 88.4 | 87.7 | 86.1 | 85.2 | 84.4 |
| Exam. 7 | | 100 | 97.2 | 91.7 | 89.8 | 88.9 | 86.3 | 85.6 | 84.1 | 83.5 | 83.1 |

Further, the elasticity of the multi-block copolymers synthesized in Examples 5, 6 and 7 were measured using Instron. Strain rates applied to the copolymers were changed by 10% respectively at a rate of 1 cm/min to measure the restoration rate of the copolymer. Table 2, above, tabulates the measured data.

As shown in Table 2, the multi-block copolymers of the present invention show excellent elasticity, which cannot be found in the conventional random copolymer as shown in Comparative Example 1 or the conventional tri-block copolymer as shown in Comparative Example 2. At 50% strain rate, the multi-block copolymers of the present invention showed over 90% restoration rate, which is much superior restoration rate as compared to 42% and 4% of the conventional copolymers.

According to the present invention, the sequentially ordered lactide/ε-caprolactone multi-block copolymers having high molecular weight can be obtained with a higher yield when compared with conventional coupling methods. Furthermore, the multi-block copolymers according to the present invention are connected by ester coupling in its molecular chain so that they can dissolve to physiologically nontoxic forms in a human body by in vivo metabolism.

The multi-block copolymers also have excellent elasticity and softness so that they overcome limitations in mechanical properties of conventional copolymers. Specifically, the biodegradable multi-block copolymers of the present invention having excellent bio-compatibility, can be used as matrix materials for medical use, wound healing/covering and material for tissue engineering.

While the present invention has been shown and described with particular examples, it will be apparent to those skilled in the art that many changes and modifications may be made without departing from the spirit and scope of the invention as defined in the appended claims.

What is claimed is:

1. A biodegradable multi-block copolymer of Formula 1 as follows,

[Formula 1]

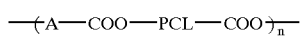

wherein,
A is polylactide (PL), or polyglycolide (PG), or polylactide/polyglycolide (PL/PG),
PCL is poly ε-caprolactone, and
n is an integer from 2 to 2,000.

2. The biodegradable multi-block copolymer according to claim 1, wherein the molecular weight of the copolymer is 2,000 to 500,000.

3. The biodegradable multi-block copolymer according to claim 1, wherein the molecular weight of polylactide, or polyglycolide or poly ε-caprolactone is 500 to 30,000.

4. The biodegradable multi-block copolymer according to claim 1, wherein the composition molar ratio of lactide, or glycolide or lactide/glycolide to ε-caprolactone is 1/9 to 9/1.

5. The biodegradable multi-block copolymer according to claim 1, wherein the composition molar ratio of lactide to ε-caprolactone is 1/9 to 9/1.

6. A method for preparing a biodegradable multi-block copolymer of Formula 1, comprising the steps of:
   providing a polylactide (or polyglycolide or polylactide/polyglycolide) and poly ε-caprolactone;
   introducing acylhalide functional groups to both terminals of said polylactide (or polyglycolide or polylactide/polyglycolide); and
   coupling the acylhalide functional groups located at the terminals of the polylactide (or polyglycolide or polylactide/polyglycolide) with the corresponding hydroxy functional groups located at the terminals of the poly ε-caprolactone; wherein Formula 1 is as follows,

[Formula 1]

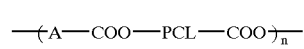

wherein,
A is polylactide (PL), or polyglycolide (PG), or polylactide/polyglycolide (PL/PG),
PCL is poly ε-caprolactone, and
n is an integer from 2 to 2,000.

7. The method according to claim 6, wherein the molecular weight of the multi-block copolymer is 2,000 to 500,000.

8. The method according to claim 6, wherein the molecular weight of polylactide, or polyglycolide or poly ε-caprolactone is 500 to 30,000.

9. The method according to claim 6, wherein the composition molar ratio of lactide, or glycolide or lactide/glycolide to ε-caprolactone is 1/9 to 9/1.

10. The method according to claim 6, wherein the composition molar ratio of lactide to ε-caprolactone is 1/9 to 9/1.

* * * * *